United States Patent [19]

Sekizawa

[11] 3,738,157
[45] June 12, 1973

[54] MANOMETER FOR SPHYGMOMANOMETER

[75] Inventor: Shine Sekizawa, Yamato, Japan

[73] Assignee: Tokyo Iryoki Kabushiki Kaisha, Tokyo-to, Japan

[22] Filed: Aug. 23, 1972

[21] Appl. No.: 283,229

[52] U.S. Cl. .................... 73/420, 73/402, 73/410, 128/2.05 G
[51] Int. Cl. .............................................. G01l 7/10
[58] Field of Search .................... 73/420, 402, 430, 73/431, 418, 410; 128/2.05 G

[56] References Cited
UNITED STATES PATENTS
1,282,632  10/1918  Rdesch ........................... 128/2.05 G Primary Examiner—Donald O. Woodiel
Attorney—Eric H. Waters, John G. Schwartz and J. Harold Nissen

[57] ABSTRACT

The bottom portion of a tapped hole for receiving a pipe fitting for hose connection in the bottom plate of a manometer for a sphygmomanometer is formed in and through a frustoconical boss part projecting downward from the lower surface of the bottom plate and split into divisional parts by a plurality of radial slots, and a clamping nut or locknut having an internal frusto-conical surface similarly as the chuck nut of a drill chuck is screwed onto the boss part. When this locknut is tightened, it compresses the boss part radially through wedge action of the conical surfaces thereby to lock the pipe fitting accurately and positively in any adjusted position without disturbance thereof due to the tightening action.

1 Claim, 5 Drawing Figures

PATENTED JUN 12 1973

3,738,157

MANOMETER FOR SPHYGMOMANOMETER

BACKGROUND

This invention relates generally to techniques in sphygmomanometry or measurement of blood pressures in the cardiovascular systems of animals. More particularly, the invention relates to a pressure gage or aneroid manometer for blood-pressure measurement wherein the locking of the adjusted position of the pipe fitting for hose connection, that is, the set position of the bottom of the pressure-sensitive mechanism, is facilitated.

In general, a pressure gage or aneroid manometer (hereinafter referred to simply as manometer) for a blood pressure measuring instrument or sphygomomanometer comprises essentially an indicating part having an indicating pointer and a calibrated dial and a pressure receiving part containing a pressure actuated mechanism as shown partially in FIG. 1 and as described below.

The pressure receiving part has a casing 1 enclosing flexible metal diaphragm chambers 2 vertically and coaxially stacked and connected at the bottom of the lowest chamber with the upper end of a vertical pipe fitting 4 for hose connection. The upper outer part of this pipe fitting 4 is provided with screw threads meshed with nut threads 6 in a bottom plate 3. The top part of the stacked diagragm chambers 2 is connected to the lower end of a vertical connecting rod 5, which is coupled at its upper part with a mechanism for rotating the indicating pointer, whereby variations in the pressure within the diaghragm chambers 2 are transmitted to this mechanism.

On one hand, the diaphgram chambers 2 have a specific deformation or deflection characteristic imparted thereto beforehand by its design, and this characteristic is not adjustable. For this reason, the positioning of the diaphragm chambers 2 within the casing 1 is accomplished by adjusting the position of the pipe fitting 4 screwed into the bottom plate 3. This adjustment is extremely important for establishing and maintaining the accuracy of the manometer.

In known manometers of this type, however, the positioning of the pipe fitting 4 is accomplished by locking the position of the pipe fitting 4 screwed into the tapped hole 6 in the bottom plate 3 as shown in FIG. 1 by means of a locknut 7. Consequently, the positioning of the pipe fitting 4 which has been once attained by careful adjustment is readily disturbed by the accompanying rotation of the pipe fitting 4 together with the locknut 7 when this locknut is tightened for locking. Accordingly, there has hitherto been an inconvenient necessity for a high degree of skill in locking the adjusted position of this pipe fitting 4 for hose connection in a manometer.

SUMMARY

In view of this inconvenience, it is an object of this invention to provide a manometer for a sphygmomanometer in which the locking of the pipe fitting for hose connection, which has been positioned by adjustment of screwed-in depth thereof, is accomplished in a very simple and positive manner.

According to this invention, briefly summarized, there is provided, in a manometer of the class referred to above, an improved arrangement of parts for locking the pipe fitting wherein a part of the tapped hole in the bottom plate into which the pipe fitting is screwed is formed in and through a convex frustoconical boss part projecting outward from the outer surface of the bottom plate and split into divisional parts by a plurality of radial slots in the boss part, which furthermore has male threads around its base part, and a chuck nut or locknut having a concave, frustoconical inner surface corresponding to the frustoconical surface of the boss parts and female threads is screwed on and around the male threads at the base of the boss thereby to press the inner surface of the nut against the frustoconical surface of the boss part and thereby to compress the boss part radially inward to clamp and lock the pipe fitting in any adjusted position thereof.

The nature, principle, and utility of this invention will be apparent from the following detailed description with respect to a preferred embodiment thereof.

DRAWINGS

In the drawings.

Throughout the accompanying drawings, like parts are designated by like reference numerals.

DETAILED DESCRIPTION

Figure 2:
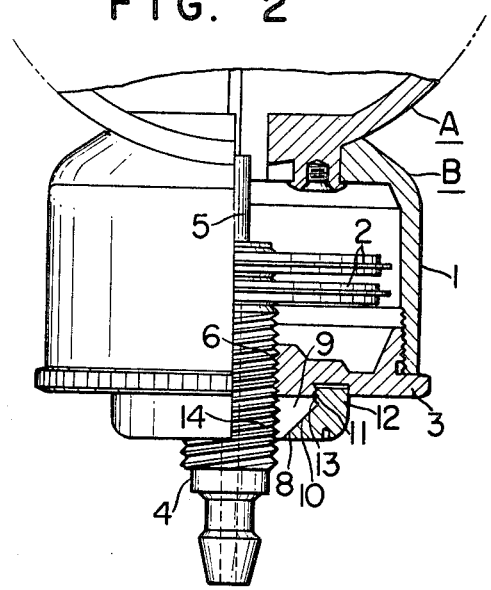
FIG. 2 is a similar elevation showing the corresponding parts of a one example of a manometer according to this invention.
Figure 3:
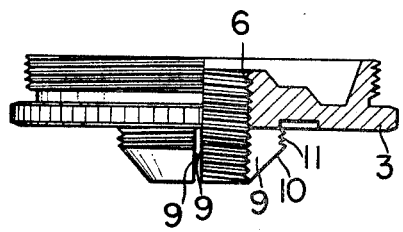
FIG. 3 is an elevation, with one half in vertical section, of the bottom plate of the manometer shown in FIG. 2.
Figure 4:
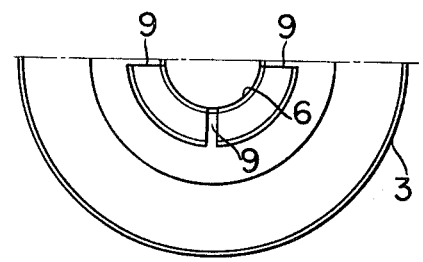
FIG. 4 is a half bottom view of the bottom plate shown in FIG. 3.
Figure 5:
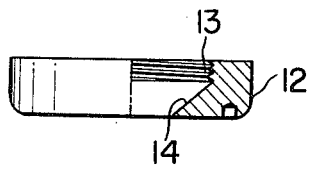
FIG. 5 is an elevation, with one half in vertical section, of a tightening nut.

The manometer shown in FIG. 2 has an indicating part A and a pressure receiving part B affixed to the lower part of the indicating part A.

The pressure receiving part B has a casing 1, which houses flexible metal diaphgram chambers 2 vertically and coaxially stacked and connected at the lower part of the lowest chamber with the upper end of a vertical pipe fitting 4 for hose connection. This pipe fitting 4 at its upper outer part is provided with male screw threads meshed with female threads of a tapped hole 6 in a bottom plate 3, which is secured by screw threads to the lower skirt part of the casing 1 thereby to close the open bottom of the casing.

The upper central part of the stack of diaphragm chambers 2 is connected to the lower end of a vertical connecting rod 5, which is coupled at its upper part with a mechanism (not shown) enclosed within the indicating part A and adapted to rotate the indicating pointer.

Figure 1:
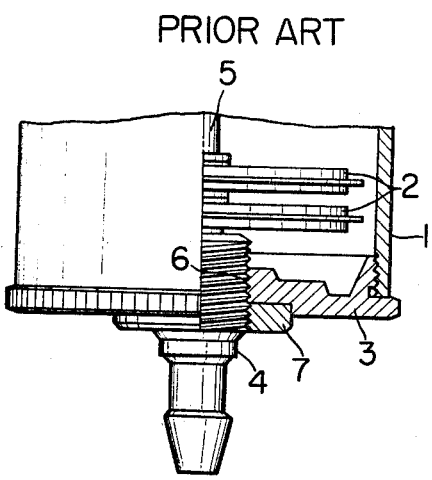
FIG. 1 is an elevation, with a part in vertical section, showing the attachment of a hose connection pipe and the pressure-actuated mechanism of an aneroid manometer or pressure gage of known design.

The above described structural features are substantially the same as those of the known manometer illustrated in FIG. 1.

In the manometer according to this invention as shown in FIGS. 2 through 5, the lower part of the threaded wall of the above mentioned tapped hole 6 is formed in a boss part 8 having a frustoconical shape and projecting downward from the lowe surface of the bottom plate 3. The conical surface 10 of the boss part 8 in this example has an inclination angle of 45°, but this invention is not to be restricted by this angle. Furthermore, the boss part 8 is split into divisional parts by a plurality of vertical radial slots 9, which in this example comprise four radial through slots equally spaced at 90° of angle to form four divided parts of the boss part.

The base part of the boss part 8 at its juncture with the 6 lower surface of the bottom plate 3 is provided with male threads 11 for engagement with female threads 13 of a tightening nut or locknut 12. The locknut 12 has therewithin a concave frustoconical surface 14 corresponding to the conical surface 10 of the boss part 8 and adapted to contact the conical surface 10 when the locknut is tightened thereon.

In assembling the pipe filling 4, it is screwed into the tapped hole 6 and is positionally adjusted. The locknut 12 is then screwed into place on and around the boss part 8 and tightened. This tightening action causes the boss part 8 to be compressed inward in the radial direction because of its split structure due to the slots 9 and because of the wedge action of the inclined surface 14 of the nut 12 in contact with the inclined surface 10 of the boss part 8. As a result, the pipe fitting 4 is fixed in unrotatable state, whereby its adjustably positioned state is securely held without distrubance.

Thus, the adjusted position of the pipe fitting 4 for hose connection can be positively locked without inadvertent dislodgement, whereby adjustment and assembly of the manometer can be carried out without special skill on the part of the assembler.

I claim:

1. In a manometer for a sphygmomanometer of the type having a pressure receiving part comprising a bottom plate, a pipe fitting for hose connection having male screw threads therearound and thereby screwed into a tapped hole in the bottom plate, and a pressure sensitive mechanism connected to the pipe fitting, the improvement wherein a part of the tapped hole is formed in and through a convex frustoconical boss part projecting outward from the outer surface of the bottomplate and split into divisional parts by a plurality of slots extending in radial directions relative to the axis of the boss part, which has made threads around its base part of juncture with the bottom plate, and a locknut having a concave, frustoconical inner surface corresponding to the frustoconical surface of the boss part and female threads is screwed on and around said male threads thereby to press said inner surface against the frustoconical surface of the boss part and thereby to compress the boss part radially inward to clamp and lock the pipe fitting in any adjusted position thereof.

* * * * *